March 20, 1951 A. V. ST. GERMAIN 2,545,679
COLLAPSIBLE BACK FOR VEHICLE SEATS
Filed Aug. 13, 1948 3 Sheets-Sheet 1
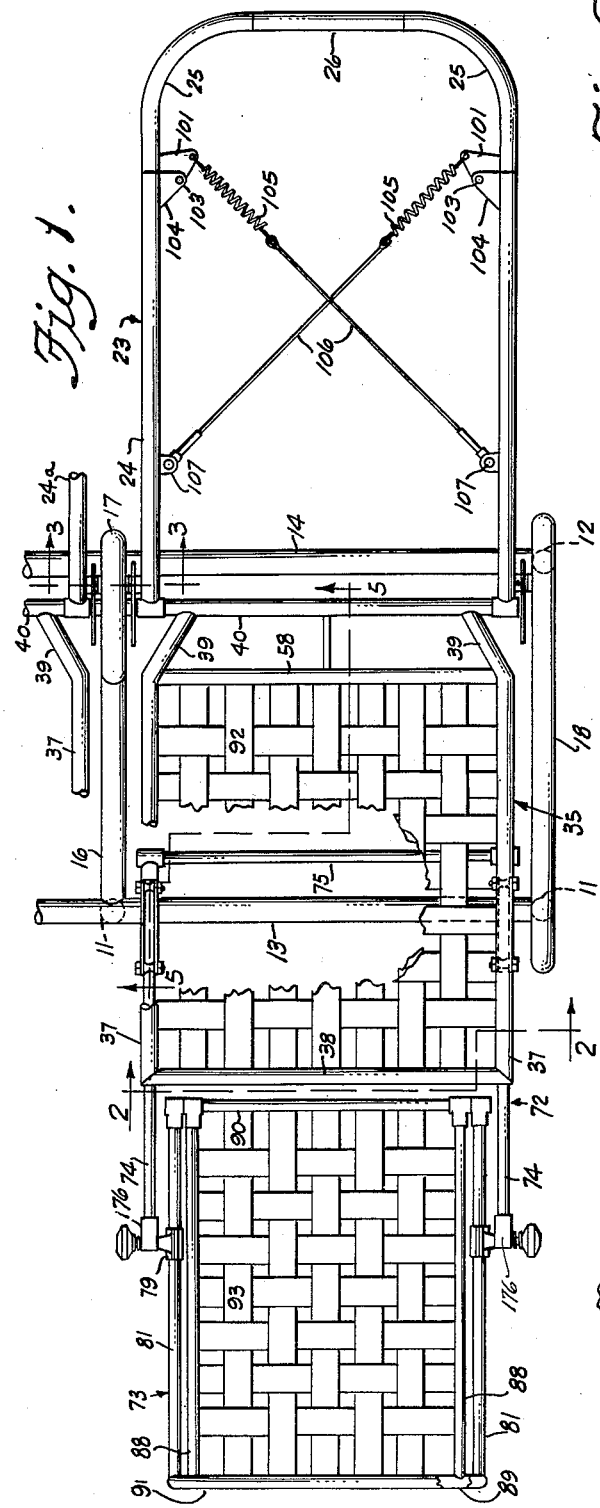
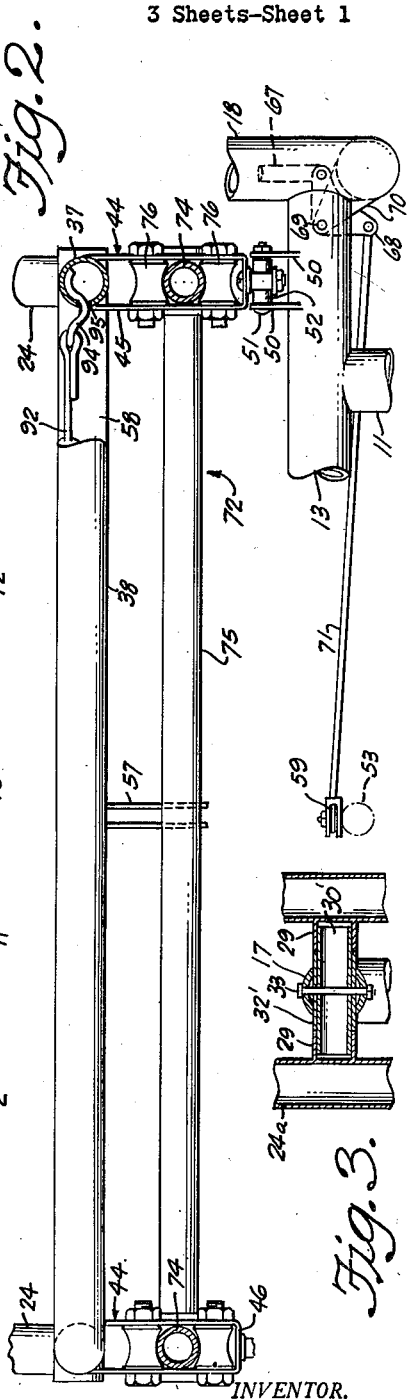
INVENTOR.
ARTHUR V. ST. GERMAIN
BY
ATTORNEY.

March 20, 1951 A. V. ST. GERMAIN 2,545,679
COLLAPSIBLE BACK FOR VEHICLE SEATS
Filed Aug. 13, 1948 3 Sheets-Sheet 2
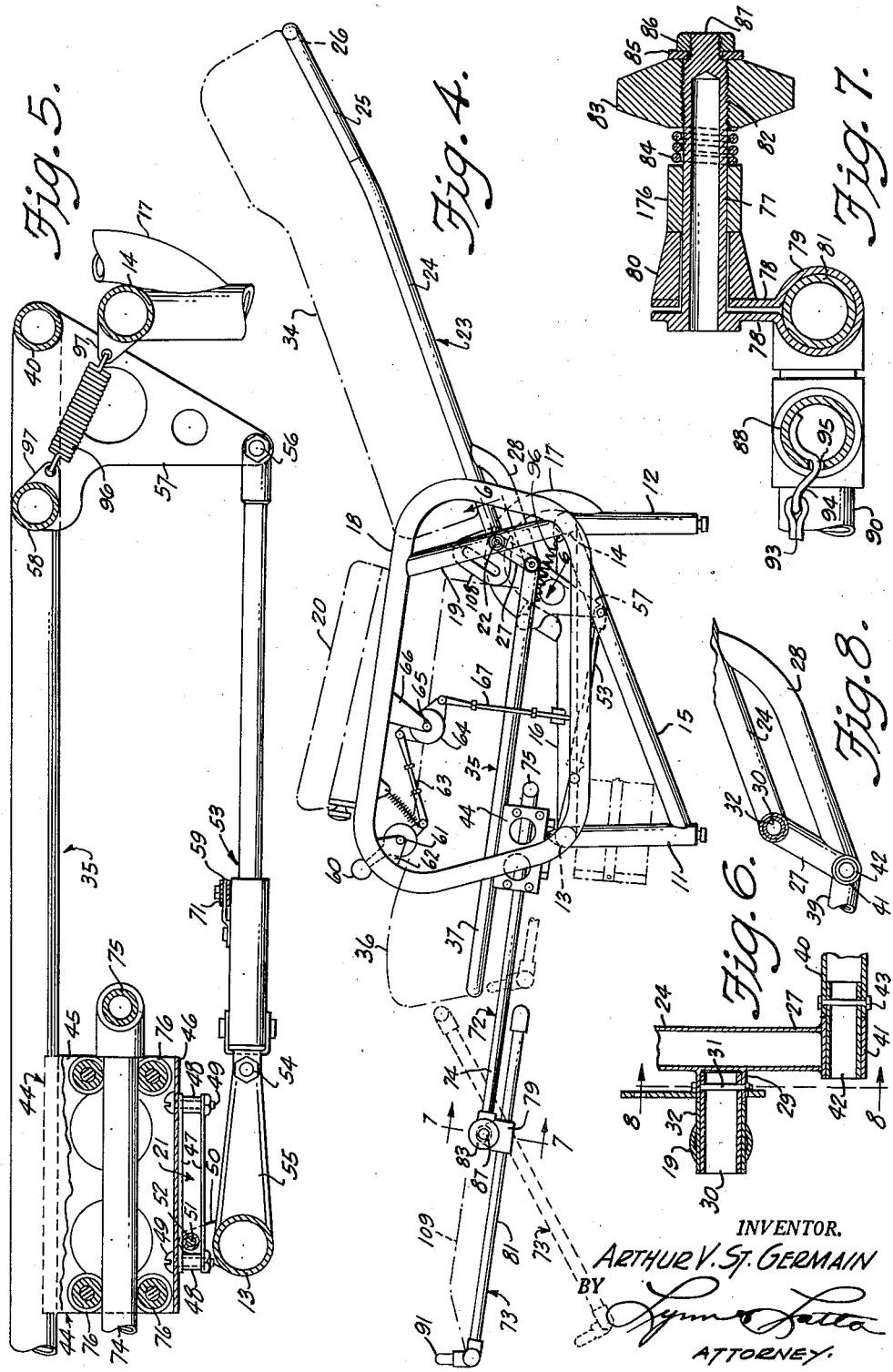
INVENTOR.
ARTHUR V. ST. GERMAIN
BY
Lynn Latta
ATTORNEY.

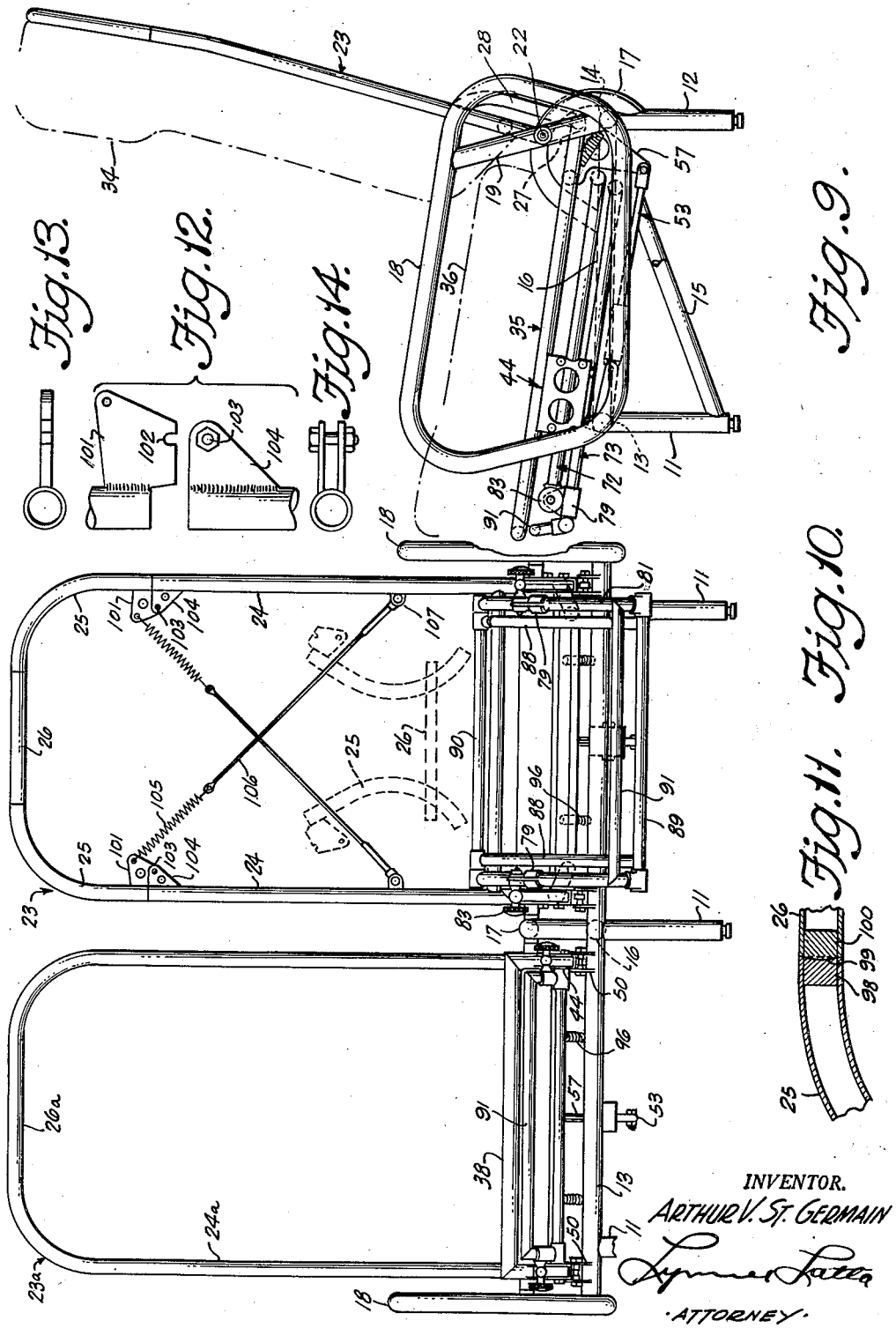

Patented Mar. 20, 1951

2,545,679

UNITED STATES PATENT OFFICE 2,545,679

COLLAPSIBLE BACK FOR VEHICLE SEATS

Arthur V. St. Germain, Camarillo, Calif.

Application August 13, 1948, Serial No. 43,980

8 Claims. (Cl. 155—194)

This invention relates to reclining seat structures in general and to aircraft seats in particular. One of the objects of the invention is to provide a reclining seat having a leg rest which, when extended, may be adjusted to give a full leg support and which may be retracted to a position completely retracted beneath the seat.

Another object is to provide a reclining seat of light weight construction.

Another object is to provide a seat having a leg rest incorporating a novel connection between the leg rest and a leg rest carriage which connects it to the seat, said connection providing for combined pivotal and sliding movement of the leg rest with reference to the carriage.

Another object is to provide in a reclining seat having a combined sliding and pivotal leg rest arrangement as outlined above, a novel and improved locking device for conjointly locking both the sliding and the pivotal connection between the leg rest and its carriage.

A further object of the invention is to provide a reclining seat having an improved arrangement of fixed frame, extensible and retractable leg rest carriage, mounted in said frame for fore and aft travel, and a leg rest having a pivotal and extensible-retractable connection with the carriage such that the leg rest may be retracted to a position substantially registering with the carriage thereby allowing the leg rest and carriage to be conjointly retracted to a position beneath the seat.

A further object is to provide a reclining seat having a novel and improved mounting for an extensible retractable leg rest carriage, which mounting is of light weight yet extremely sturdy construction.

A further object is to provide an arrangement for supporting an extensible-retractable leg rest carriage beneath a seat which is in itself retractable and extensible with reference to a fixed frame in which it is supported.

More specifically, the invention contemplates the combination of a seat bottom, mounted for fore and aft extension and retraction, a leg rest carriage, supported directly beneath the side members of the seat bottom for fore and aft extension and retraction, and a leg rest, supported on the forward end of the carriage for a combination of fore and aft extension and retraction and tilting about a transverse horizontal axis located at the forward end of the carriage, with the carriage retracting to a position beneath the seat bottom and the leg rest retracting to a position beneath the carriage.

A further improvement contemplated by the invention is the employment of a leg rest carriage in the form of a yoke or U-shaped frame which is open between the forward ends of its side arms so as to allow the leg rest to tilt to a position in which its plane intersects the plane of said side arms without interference.

Another feature of the invention is an arrangement in which the leg rest slides on and derives support from the forward transverse member of the fixed frame when moving to and assuming its retracted position.

Another feature of the invention is the provision of roller support units which function both to provide anti-friction support for the leg rest carriage in its fore and aft travel and also to provide rolling support for the forward portion of the seat bottom. A further characteristic of the invention is the dimensioning of the leg rest so that its side extremities are offset inwardly from the side members of the leg rest carriage and the above mentioned roller support units, whereby the leg rest may be received between the roller support units without interference, and may bear directly upon the transverse fixed frame member as mentioned above.

Another improved characteristic of the invention is the provision of a leg rest which has at each side a pair of closely spaced parallel side members, collectively providing two outer rails for sliding support of the leg rest and two members disposed inboard of said rails, to which the leg rest webbing is anchored.

Another important improved characteristic of the invention is the construction of a seat back and seat bottom frame members and their pivotal connections to each other and to the fixed frame, in which pivots are developed from traverse bushings welded to the respective frame members, and sleeve type trunnion members journalled within such bushings, with the trunnions attached to the respective frame members and being telescoped within the end portions thereof or into sockets welded thereto.

Another important feature of improvement embodied in the invention is an arrangement in which the seat bottom has its rear corners cut away or offset inwardly to permit the side arms of the seat back to be hinged thereto and to lie in the same plane as the side arms of the seat bottom.

Another object of the invention is to provide an aircraft seat having a back which is collapsible under a predetermined impact load from behind, in order to reduce the likelihood of injury to a passenger thrown from one seat forwardly against the seat ahead, in an airplane accident.

Other objects will become apparent in the ensuing specifications and appended drawings in which:

Fig. 1 is a plan view of an aircraft seat (one of a pair) embodying my invention, shown in the reclining position, parts being broken away and shown in section;

Fig. 2 is a transverse vertical sectional view taken on the line 2—2 of Fig. 1;

Fig. 3 is a detail sectional view taken on the line 3—3 of Fig. 1;

Fig. 4 is a side view of one of the seats in a 70 degree reclining position;

Fig. 5 is a detail sectional view taken generally as indicated by the line 5—5 of Fig. 1;

Fig. 6 is a detail sectional view taken as indicated by the line 6—6 of Fig. 4;

Fig. 7 is a detail sectional view taken as indicated by the line 7—7 of Fig. 4;

Fig. 8 is a detail sectional view taken as indicated by the line 8—8 of Fig. 6;

Fig. 9 is a side view of the seat of Fig. 4 shown in its upright position, with leg rest and leg rest carriage retracted;

Fig. 10 is a front view of the pair of seats, the back of one of the seats being plain and the back of the other embodying the collapsible safety feature referred to hereinbefore; the leg rest of one seat being shown extended, and that of the other being shown retracted;

Fig. 11 is a detail sectional view of a portion of the safety back;

Fig. 12 is an exploded view of one of the callapsible safety back releasable connections;

Fig. 13 is a detail of one of the parts of Fig. 12; and

Fig. 14 is a detail of the other part of Fig. 12.

As an example of one form in which the invention may be embodied, I have shown in the drawings an aircraft seat which is constructed largely of light weight metal tubing. The seat includes a fixed frame comprising front and rear legs 11 and 12 respectively, transverse bars 13 and 14 connecting the legs 11 and 12 respectively, and braces 15 which are attached to the lower ends of the legs 11 and to the cross bar 14 respectively, and function to impart rigidity to the fixed supporting frame structure in a fore and aft direction.

In an arrangement embodying a pair of the seats, there are three each of the legs 11 and 12, the transverse bars 13 and 14 being connected by a longitudinal horizontal bar 16 which lies in the plane of the central legs 11 and 12. A C-shaped yoke 17 has one end secured to the central rear leg 12 and its other end secured to an intermediate region of the longitudinal central bar 16. Secured to the ends of the transverse bars 13 and 14 are side frame members 18 which are approximately in the form of trapezoidal closed loops with rounded corners. The side frame members 18 function primarily to support seat back pivots hereinafter described. Accordingly, the frames 18 are provided with posts 19, which are attached at their respective ends to the upper and lower parts of the side frame members 18. The side frame members 18 secondarily function to support arm rests 20. The horizontal transverse axis 22 of the swinging movement of seat backs 23 is located at the intersection of the common plane of the posts 19 and the arch member 17. Each seat back 23 has an outer side pivotally supported by a post 19 and an inner side pivotally supported by the arch member 17.

The invention may be embodied in a single seat, in which case the central longitudinal bar 16 and arch member 17 are eliminated and one of the arm rest supporting frames 18 is utilized at each side of the seat.

The seat back 23 may embody collapsible safety features which, for illustrative purposes, have been depicted in one of the pair of seats shown in Fig. 10, embodying side arms 24 joined by arcuate corner members 25 and the transverse end bar 26 to form a U-shaped frame, or, if the safety feature is not desired, may comprise a simple one piece U-shaped frame 23a having side arms 24a integrally joined by the transverse end bar 26a, as shown in the other seat of Fig. 10. In either case the side arms 24 (or 24a) have their lower ends extended at angles of approximately 140 degrees thereto, to form crank arms 27 which are rigidified by braces 28 joining their outer ends to the arms 24.

At the junction of the arms 24 and crank arms 27 (Figs. 6 and 8), each seat back frame is provided with a pair of cylindrical socket members 29 comprising short tube sections welded to the junctions. Into the socket members 29 at the outer sides of the seat back frames, short trunnion sleeves 30 are secured as by means of bolts 31. The trunnion sleeves 30 are journalled in bushings 32 which pass through the post 19 and are secured therein as by welding. Aligned with the bushings 32 (Fig. 3) is a central sleeve 32' which is passed through the arch member 17. A trunnion sleeve 30' extends through the sleeve 32' and has both ends projecting therefrom to constitute trunnions that are journalled in the socket members 29 on the inner sides of the seat frames. The sleeves 32' and 30' are secured in assembly with the arch member 17 by means of a bolt 33 passed through all three members.

The trunnion ends of sleeve 30' are sufficiently short so that the seat backs may be installed thereon, utilizing the clearance existing between the outer sides of the seat back frames and the side frame posts 19 prior to insertion of sleeves 30. The sleeves 30 may then be inserted through the bushings 32 and secured in place.

The seat backs 23 and 23a are appropriately upholstered with back cushions 34 which are indicated in broken lines in Figs. 4 and 9.

Each seat is provided with a seat bottom 35 the rear end of which is suspended from the lower end of a corresponding seat back frame, and the forward portion of which is supported for sliding movement upon the forward cross frame member 13 by means which will be described hereinafter. Each seat bottom supports a conventional upholstered seat cushion 36 which is indicated in broken lines in Figs. 4 and 9.

As shown most clearly in Fig. 1, each seat bottom 35 embodies a frame including a pair of side arms 37 joined at their forward ends by a cross bar 38 and bent inwardly at their rear ends as at 39 to join a rear cross bar 40. The inwardly bent portions 39 provide for location of the side arms 37 in the same vertical plane as the side arms 24 (or 24a) of the seat back frames 23 (or 23a). To the lower end of each crank arm 27 (Fig. 6) is secured a short transverse bushing 41 in which is journalled a short trunnion sleeve 42 secured as by means of a bolt 43 in an end portion of the rear cross bar 40 which projects beyond the inwardly bent corner portions 39 of the side arms 37.

The sliding support of the forward portion of the seat bottom is provided for (Figs. 2 and 5) by yoke shaped brackets 44 embodying spaced parallel arms 45 the upper edges of which are welded to a respective side arm 37 of the seat bottom. The arms 45 are joined by a bottom web portion 46. Each of the yokes 44 supports a roller track 21 which is comprised of a pair of hardened strips 47 maintained in spaced parallel relation by tubular spacers 48 and joined to each other and to the web 46 by bolts 49 extending through the spacers 48. Pairs of tabs 50 are welded to the upper side of the transverse forward frame member 13, and support bolts 51 on which are journalled rollers 52 which extend transversely between the track strips 47. The weight of the seat bottom is supported upon the upper strips 47 as it travels forwardly and rearwardly on the rollers 52 (Fig. 5).

The seat bottom 35 is urged rearwardly by coil springs 96 (Fig. 5) connected under tension between the rear transverse bar 14 and the intermediate cross bar 58 of the seat bottom 35, by means of the tabs 97 secured to the respective cross bars.

It will now be apparent that longitudinal shifting movement will be imparted to the seat bottom 35 by the crank arms 27 of the seat back as the latter is swung from an upright to a reclining position and vice versa, the seat bottom sliding forwardly as the seat back is reclined and rearwardly as the seat back is raised.

A conventional seat position lock unit 53 has one end pivoted, by means of a bolt 54, between a pair of ears 55 that are secured to the forward cross bar 13. The other end of the locking unit 53 is pivoted, by means of a bolt 56, between the lower ends of arms 57 which are secured at their upper extremities between the rear cross bar 40 and a cross bar 58 of the seat bottom 35, disposed forwardly of the rear bar 40. The actuator lever 59 of the locking unit 53 is operated by a hand lever 60 (Fig. 4) which is pivoted at 61 on a bracket 62 at the upper forward corner of an outer side frame member 18. Movement is transmitted from the lever 60 to the lever 59 through linkage including a push-pull rod 63, one end of which is pivoted to the lever 60 and the other end of which is pivoted to an arm of a bell crank 64. The bell crank 64 is pivoted at 65 on a bracket 66 secured to the under side of the upper bar of outer side frame member 18. A push-pull rod 67 is pivoted to the other arm of bell crank 64 and is extended downwardly, where it is pivoted to an arm of a bell crank 68 (Fig. 2) pivoted at 69 between a pair of brackets 70 which are secured to the lower bar of side frame member 18. A push-pull rod 71 has one end pivoted to bell crank 68 and its other end pivoted to lever 59.

Retractable leg rest mechanism includes a leg rest carriage 72 (Figs. 1, 2 and 4) (which is mounted for fore and aft travel beneath the seat bottom 35) and a leg rest 73 which is carried by the outer end of the carriage 72 and is adapted to have both pivotal and sliding movement relative thereto.

The carriage 72 is in the form of a yoke or U-shaped frame having side arms 74 connected by a rear cross bar 75, (Figs. 1, 4 and 5). The side arms 74 are mounted for fore and aft travel between rollers 76 which are journalled between the arms 45 of yokes 44. It will now be apparent that the yokes 44 serve a double function of supporting the roller 76 and also of supporting the track strips 47.

The forward end of each side arm 74 of the carriage 72 is equipped with a T-fitting 176 which provides a transverse aligned bearing in which is supported a pivot stud 77 (Fig. 7). The inner end of the stud 77 is secured to the inboard one of a pair of spaced ears 78 (which constitute end extensions of guide loops 79). A spacer 80 is interposed between the T-fitting 176 and the outboard ear 78. The guide 79 encircles a slide rail 81 of the leg rest 73. The stud 77 has a threaded portion 82 projecting from the T-fitting 176, and a hand wheel 83 is threaded thereon. A compression spring 84 is interposed between the hand wheel 83 and the T-fitting 176 and tends to press the hand wheel 83 outwardly against an abutment washer 85 which is retained by a nut 86 threaded on a reduced threaded end portion 87 of the stud 77. Rotation of the hand wheel 83 in the proper direction will compress and apply pressure through the spring 84, fitting 176 and spacer 80 to the outboard ear 78 while drawing the stud 77 in the opposite direction, thus forcing the ears 78 toward each other to clamp the guide loop 79 upon a slide rail 81, and to simultaneously lock the stud 77 against rotation in the T-fitting 176. Since the stud 77 is secured to the inboard ear 78, this will lock the pivotal connection between the leg rest 73 and the carriage 72.

The leg rest 73 includes the slide rails 81, a pair of side arms 88 (which are parallel to and inboard of the rails 81), and forward and rear cross bars 89 and 90 connecting the respective slide rails 81 and side arms 88. The leg rest 73 is provided with a toe member 91 of arch shape, which is secured to the forward ends of the slide rails 81 and is diposed above and parallel to the forward cross bar 89.

Suitable webbing 92 and 93 (e. g. of plastic strap material) is fastened between the frame members 37, 38, and 58 of the seat bottom 35, and between the frame members 88, 89 and 90 of the leg rest 73. The ends of the plastic strap members may be connected to the respective frame bars by hooks 94 of approximately S-shape, extended through openings 95 (Figs. 2 and 7) in the respective frame members. The arm of the hook member which is disposed within a frame member is of such a shape as to conform to the inner surface of the tubular wall of the frame member, and the arm of the hook member which is disposed outside the tube is bent so as to lie opposite the inner arm, whereby the pull against the outer arm will cause the hook member to fulcrum in the closely fitting opening 95 and derive adequate support from the inner wall of the tubular frame member without slipping. The leg rest is provided with a cushion which is indicated in broken lines at 109 in Fig. 4.

It may now be noted that when the hand wheel 83 is loosened, it is possible to slide the leg rest through the supporting guide loops 79 so as to extend or retract the leg rest with reference to the carriage 72. At the same time, the carriage 72 may be extended or retracted by sliding between the rollers 76. Extended positions of both carriage and leg rest are shown in Fig. 4 and fully retracted positions of both are shown in Fig. 9. In the retracted positions, as will be apparent from Fig. 9, the leg rest is disposed beneath the carriage 72, substantially coextensive therewith, and withdrawn rearwardly of the axis of pivot studs 77. Both leg rest and carriage are disposed entirely beneath the seat bottom 35. Leg rest 73 engages the top side of transverse bar 14 and is thereby supported against pivotal movement with reference to the carriage 72. In the extended position of the carriage 72, the leg rest is extended substantially forwardly of the axis of pivot studs 77 and may be tilted about said axis until the desired position of the leg rest (e. g. shown in dotted lines in Fig. 4) is attained. Such position may, for example, be one in which its aft end has moved upwardly to a position closely adjacent to the forward extremity of the seat cushion 36. This makes it possible to provide full support for the legs, from the feet up to the knees.

Referring now to Figs. 10 to 14 inclusive, the collapsible seat back structure embodies a break-away connection between the ends of the cross bar 26 and the inner ends of corner members 25. As shown in Fig. 11, such break-away connection is comprised of plugs 98 secured in the ends of the corner members 25 and having concave end faces providing sockets 99, and plugs 100 secured in the ends of the cross bar 26 and having convex end faces mating with the sockets 99. The lower ends of corner members 25 are provided with tabs 101 which project beyond said lower end and have notches 102 which receive bolts 103 mounted between ears 104 on the upper ends of side arms 24. The ends of corner members 25 abut the ends of arms 24 when the bolts 103 are received in the notches 102. Tension springs 105 are each anchored at one end to an upper and inner extremity of a tab 101 and at its other end to a cable 106 the other end of which is anchored between tabs 107 secured to the lower ends of arms 24. The springs 105 and cables 106 extend diagonally in cross relation as shown in Fig. 10, and exert diagonal pull against the corner members 25, thereby simultaneously maintaining the tabs 101 in engagement with bolts 103 and the inner ends of corner members 25 securely socketed against the ends of the cross bar 26 so as to retain the latter normally in the position shown in Fig. 10.

In the event of an accident impelling a passenger forwardly from his seat so as to cause his forehead or shoulders to strike the upper end of the seat back just ahead of him, the cross bar 26 will be dislodged from its sockets and the springs 105 will immediately snap the corner members 25 inwardly and downwardly so that the entire upper structure of the seat back frame, beyond the upper ends of side arms 24 will be literally pulled into the lower portion of the seat back, leaving only the soft foam rubber seat back cushion 34 projecting above side members 24. In effect, therefore, the impact of the passenger's body is absorbed by the cushion 34. It is to be understood that all of the frame structure is enclosed within the conventional upholstering envelope and that the displaced parts of the seat back frame will be retained within this envelope after they have been dislodged. Approximate positions to which the corner members 25 and the cross bar 26 will be displaced are indicated in dotted lines in Fig. 10. Safety belt fittings 108 are hung upon the socket members 29 of the seat back frame 23.

Instead of tension coil springs 105, it is to be understood that any equivalent device such as a stretchable shock cord, may be employed in the collapsible seat back construction.

All of the frame members of the fixed supporting frame, the seat back, the seat bottom 35, the carriage 72 and the leg rest 73, including members 11, 12, 13, 14, 15, 17, 17, 18, 19, 23, 24, 25, 26, 27, 29, 32, 37, 38, 39, 40, 41, 58, 74, 75, 81, 88, 89, 90 and 91, are of thin metal tubing of progressively diminishing diameter, approximately in the proportions shown in Figs. 1 and 4. Consequently, the seat is quite light weight though extremely strong and therefore suitable for use in aircraft. At the same time, the welded tubular construction provides an extremely sturdy and rigid seat frame structure. Also, it is to be understood that the seat may be adapted for use in passenger automobiles and buses, railway cars, boats of all kinds, auditoriums, hospitals, or private homes (e. g., in a chaise longue).

I claim:

1. In a reclining seat for vehicles, a seat back frame including a pair of lower side members and a pair of upper side member sections and means connecting said upper side member sections, said last means being separable from said upper side member sections, separable hinge means constituting a releasable connection between said upper side member sections and said lower side members, spring means exerting downward tension against said upper side member sections and cooperating with said connecting means to normally hold said upper side member sections and additional connecting means in assembly with said lower side members, said first named connecting means having connections with said upper side member sections which are releasable under impact, said spring means becoming operative upon release of said connecting means to pull said upper side member sections downwardly into the confines between the lower side members.

2. A collapsible back for vehicle seats comprising a pair of lower side frame members, a pair of upper side frame member sections having lower ends adjoining the upper ends of said lower side frame members, said upper side frame member sections having inwardly turned upper ends, a horizontal connecting bar having socketing connections with said inwardly turned upper ends, spring means arranged to exert downward and inward pull against said upper side member sections, means providing quickly releasable connections between said adjoining lower and upper ends of said upper side member sections and lower side members, said releasable connections being maintained in connected relation by the downward and inward pull of said spring means and the opposing pressure of the ends of said connecting bar against said inwardly turned ends of said upper side member sections, said connecting bar being releasable under impact and thereby permitting said upper side member sections to be drawn inwardly and downwardly into the confines of the lower side members.

3. A collapsible back for vehicle seats comprising a peripheral cushion supporting frame including side frame members and a plurality of collapsible frame sections movably connected to the upper ends of said side frame members for collapsing movement into the lower region of the area defined within said frame, means normally joining said sections in releasable mutually supporting relation defining the upper portion of said peripheral frame, said last means being operable in response to impact, to release said sections for said collapsing movement, and resilient means constantly biasing said sections in the direction of said collapsing movement.

4. A seat back as defined in claim 3, wherein said releasable joining means comprises a bar normally disposed as a horizontal top bar of said frame, said bar and said sections having abutting ends formed with socketing connections that are separable in response to pressure applied to said bar transverse to its axis, said resilient means yieldingly urging said socketing connections axially into abutting interconnected relationship.

5. A seat back as defined in claim 3, wherein said releasable joining means comprises a bar normally disposed as a horizontal top bar of said frame, said bar and said sections having abutting ends formed with socketing connections that are separable in response to pressure applied to said bar transverse to its axis, said resilient means yieldingly urging said socketing connections axially into abutting, interconnected relationship, said resilient means acting against said sections to draw their upper ends toward each other and downwardly, and functioning additionally, upon separation of said socketing connections, to effect said collapsing movement of the sections.

6. A seat back as defined in claim 2 wherein said releasable connections each comprise tabs secured respectively to the lower end of a respective upper side frame member section and to the upper end of the corresponding lower side frame member, and a separable pivotal connection between the respective tabs, said spring means being connected to the tabs that are secured to said upper side frame member sections.

7. A seat back as defined in claim 2, wherein said releasable connections each comprise a tab secured to the lower end of a respective upper side frame member section and projecting inwardly, a pair of ears secured to the upper end of the respective lower side frame member and spaced apart to receive the lower portion of said tab, and a bearing pin supported between said ears, said tab having in its lower side a notch normally receiving said bearing pin to provide a pivotal connection between said sections and said lower side frame members, said spring means comprising coil springs having their upper ends attached to said tabs above said pivots, whereby the pull of said springs, upon release of said connecting bar, will cause said sections to pivot inwardly and downwardly to points where said tabs are pulled away from said bearing pins.

8. A seat back as defined in claim 2, wherein said releasable connections comprise hinge members attached respectively to the lower ends of said upper side frame member sections and to the upper ends of said lower side frame members, extending inwardly and having separable pivotal connections therebetween, and wherein said spring means comprises spring sets each including a coil spring and a flexible link arranged in series between a hinge member of a respective upper side frame member section and the lower portion of a respective lower side frame member, said spring sets being arranged in crossed relationship, each extending diagonally from the upper portion of one side of the frame to the lower portion of the other side thereof.

ARTHUR V. ST. GERMAIN.

REFERENCES CITED

The following references are of record in the file of this patent:

UNITED STATES PATENTS

| Number | Name | Date |
|---|---|---|
| 710,321 | Grosjean | Sept. 30, 1902 |
| 749,524 | Bowen | Jan. 12, 1904 |
| 1,097,405 | Erb | May 19, 1914 |
| 1,687,333 | Headley | Oct. 9, 1928 |
| 2,335,234 | Caeser et al. | Nov. 30, 1943 |
| 2,397,322 | McArthur | Mar. 26, 1946 |
| 2,409,316 | Rogers | Oct. 15, 1946 |
| 2,423,816 | Renkes | July 8, 1947 |

FOREIGN PATENTS

| Number | Country | Date |
|---|---|---|
| 450,839 | Great Britain | July 20, 1936 |
| 784,431 | France | Apr. 29, 1935 |